United States Patent
Pang et al.

(10) Patent No.: US 7,327,672 B1
(45) Date of Patent: Feb. 5, 2008

(54) SIGNAL ROUTING IN A NODE OF A 1:N AUTOMATIC PROTECTION SWITCHING NETWORK

(75) Inventors: Simon S. Pang, San Diego, CA (US); Joseph J. Balardeta, Carlsbad, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 1009 days.

(21) Appl. No.: 10/356,167

(22) Filed: Jan. 31, 2003

(51) Int. Cl.
*G06F 11/00* (2006.01)

(52) U.S. Cl. .......................... 370/228; 370/217; 714/4

(58) Field of Classification Search ............... 370/219, 370/226, 227
See application file for complete search history.

(56) References Cited

U.S. PATENT DOCUMENTS

| | | | | |
|---|---|---|---|---|
| 5,159,595 A | * | 10/1992 | Flanagan et al. | 370/224 |
| 5,278,824 A | * | 1/1994 | Kremer | 370/223 |
| 5,546,403 A | * | 8/1996 | Yamamoto et al. | 714/716 |
| 5,663,949 A | * | 9/1997 | Ishibashi et al. | 370/220 |
| 5,712,847 A | * | 1/1998 | Hata | 370/228 |
| 5,870,382 A | * | 2/1999 | Tounai et al. | 370/220 |
| 6,091,705 A | * | 7/2000 | Regula | 370/223 |
| 6,219,336 B1 | * | 4/2001 | Takahashi et al. | 370/223 |
| 6,674,713 B1 | * | 1/2004 | Berg et al. | 370/217 |
| 6,735,171 B2 | * | 5/2004 | Takeguchi | 370/235 |
| 6,985,488 B2 | * | 1/2006 | Pan et al. | 370/395.3 |

\* cited by examiner

*Primary Examiner*—Chi Pham
*Assistant Examiner*—Kevin Mew
(74) *Attorney, Agent, or Firm*—Incaplaw;; Terrance A. Meador (57) ABSTRACT

Automatic protection switching is implemented by channel devices in a data communication system node. Each channel devices includes input and output ports, a data receive port, a data send port, and a signal routing arrangement controlled by a processor element. The signal routing arrangement routes data between the channel devices such that, in the event of a channel failure, one channel device functions as a protection channel device. In a normal operating mode, each channel device routes data from its data receive port to its data send port, and routes data from its input port to its output port. In a protection mode, the protection channel device (and the protected channel device) routes data from its data receive port to its output port, and routes data from its input port to its data send port, while the remaining working channel devices function in the normal operating mode.

16 Claims, 7 Drawing Sheets

SIGNAL ROUTING IN A NODE OF A 1:N AUTOMATIC PROTECTION SWITCHING NETWORK

FIELD OF THE INVENTION

The present invention relates generally to data communication networks. More particularly, the present invention relates to automatic protection switching techniques utilized in a data communication network.

BACKGROUND OF THE INVENTION

SONET/SDH networks employ automatic protection switching (APS) techniques to protect one or more working channels with a backup protection channel. In response to a circuit, hardware, or network failure, the traffic load carried by the adversely affected channel is automatically switched to the protection channel such that the effect of the failure is minimized. One type of APS network strives to protect a plurality of channels using a single protection channel. This form of APS network is commonly referred to as a 1:N network, where N is an integer greater than one.

APS techniques utilize routes between channel devices (e.g., transmit devices, receive devices, or transceiver devices) located at a network node. One prior art technique employs a mesh architecture in which each channel device in a node is connected to every other channel device in the node, thus facilitating signal routing between any two channel devices. If the node contains N channel devices, the APS mesh requires N−1 interconnecting routes corresponding to each channel device. Consequently, the number of routes associated with each channel device increases as the number of channel devices increases. In this regard, mesh architectures can be undesirably complex, in that the total number of routes is equal to the quantity $$\frac{N^2 - N}{2},$$

and the channel device drivers must be designed to drive all of the N−1 routes.

BRIEF SUMMARY OF THE INVENTION

An APS network according to the present invention efficiently routes channel signals in a node of a data communication system. The APS architecture can be utilized to protect N working channels with a single protection channel (a 1:N configuration) with a constant number of interconnecting data paths between the channel devices. In other words, the number of routes between channel devices does not increase with the number of channel devices.

The above and other aspects of the present invention may be carried out by a data communication channel device, a data communication node and/or an APS network as described herein.

BRIEF DESCRIPTION OF THE DRAWINGS

A more complete understanding of the present invention may be derived by referring to the detailed description and claims when considered in conjunction with the following Figures, wherein like reference numbers refer to similar elements throughout the Figures.

DETAILED DESCRIPTION OF A PREFERRED EMBODIMENT

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, logic elements, look-up tables, and the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

It should be appreciated that the particular implementations shown and described herein are illustrative of the invention and its best mode and are not intended to otherwise limit the scope of the invention in any way. Indeed, for the sake of brevity, conventional techniques for data transmission, signaling, switching, clocking, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical embodiment.

Figure 1:
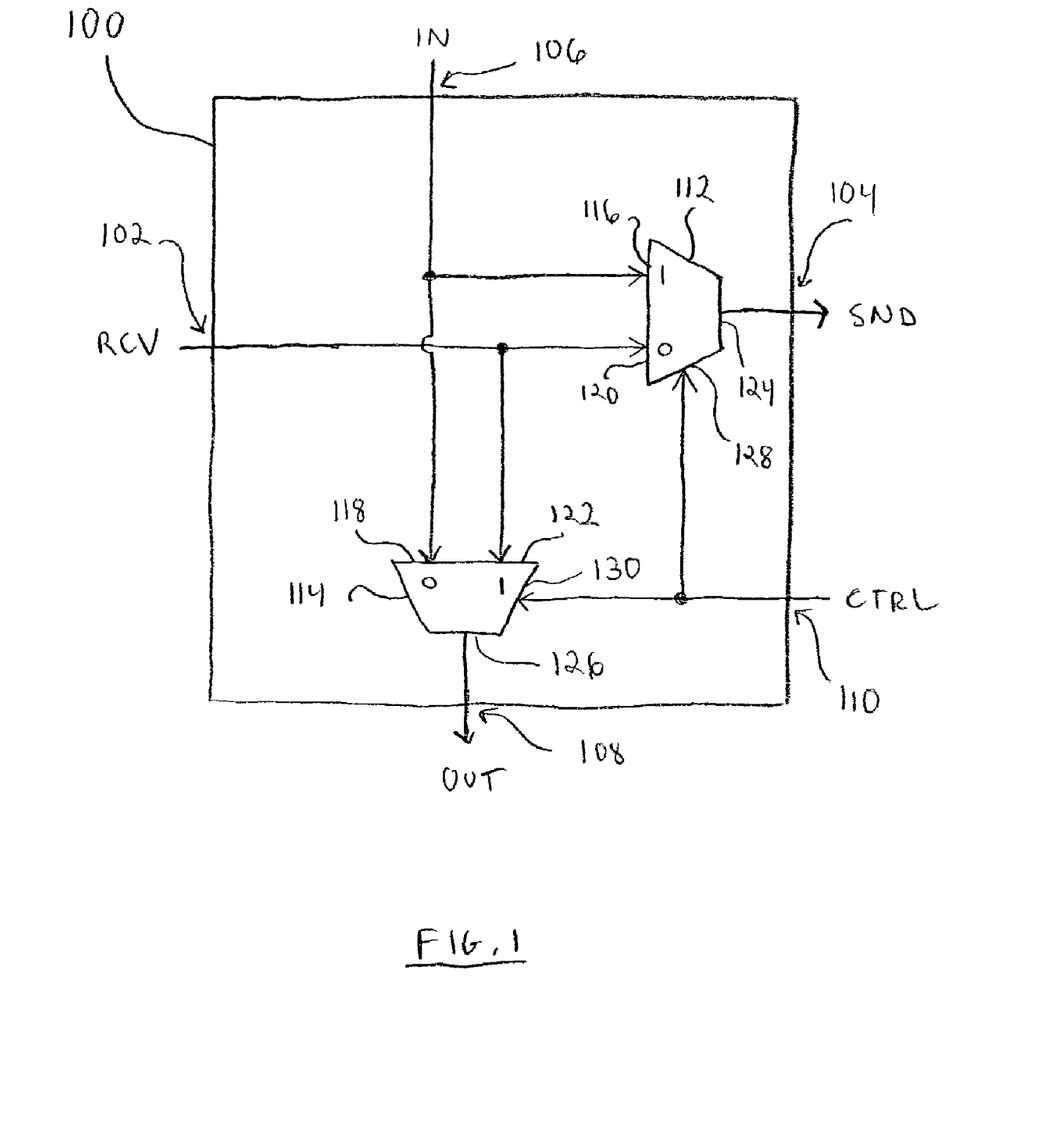
FIG. 1 is a schematic representation of a channel device configured in accordance with the present invention.

FIG. 1 is a schematic representation of a channel device 100 configured in accordance with the present invention. Channel device 100 may be implemented in any number of practical data communication devices, e.g., a SONET transceiver component. In a practical embodiment, channel device 100 may be realized in hardware, software, firmware, or any suitable combination thereof. Briefly, channel device 100 receives an incoming channel data signal at a data receive (RCV) port 102 and, in the normal operating mode, makes the channel data signal (or a data signal based on the received channel data signal) available at a data send (SND) port 104. The data signal can then be transmitted in accordance with conventional techniques over a suitable communication channel to a corresponding destination channel device (not shown). In a practical data communication system, a plurality of channel devices 100 can be co-located at a network node, e.g., a transmit node, a receive node, or a transceiver node. Channel device 100 also includes an input (IN) port 106, an output (OUT) port 108, a control signal (CTRL) port 110, and a signal routing arrangement. In the example embodiment, the signal routing arrangement includes a number of signal selection elements, such as multiplexers 112/114. Alternatively, the signal routing arrangement may utilize any combination of logic elements, switches, devices, gates, or the like to facilitate routing and re-routing of data and signals associated with channel device 100. As described in more detail below, the signal routing arrangement is configured to route data from IN port 106 to OUT port 108 or to SND port 104, and to route data from RCV port 102 to OUT port 108 or to SND port 104.

Channel device 100 is suitably configured such that an input data signal received at IN port 106 is routed (directly or indirectly) to an input port 116 of multiplexer 112 and to an input port 118 of multiplexer 114. Channel device 100 is also configured such that a channel data signal received at RCV port 102 is routed (directly or indirectly) to an input port 120 of multiplexer 112 and to an input port 122 of multiplexer 114. In this regard, channel device 100 may include any number of conductive elements, traces, wires, or the like that establish conductive paths from IN port 106 to multiplexers 112/114 and from RCV port 102 to multiplexers 112/114.

In the example embodiment, each multiplexer 112/114 includes two input ports and one output port. In accordance with conventional methodologies, each multiplexer 112/114 selects one of its two input signals as its output signal. For example, multiplexer 112 selects either the signal at input port 116 or the signal at input port 120, and makes the selected signal available at its output port 124. Similarly, multiplexer 114 selects either the signal at input port 118 or the signal at input port 122, and makes the selected signal available at its output port 126. Each multiplexer 112/114 includes a respective enable port 128/130 that receives a respective control signal that dictates the selection of the input signal. The format and/or characteristics of the control signals may vary depending upon the practical implementation of the signal routing arrangement. In the example embodiment, multiplexers 112/114 each receive a common one-bit control signal provided to CTRL port 110. In a working implementation, the control signal (or signals) can be generated by a suitable processor that supports channel device 100. The processor may analyze and/or process any number of parameters, e.g., channel conditions, network performance criteria, or bit error rate, and generate a suitable control signal in response to such parameters. In this regard, the processor is configured to control the signal routing arrangement to provide automatic protection switching for the data communication node in which channel device 100 is implemented.

When the control signal is a logic high, data at IN port 106 (or data based on the IN data) is routed to SND port 104, and data at RCV port 102 (or data based on the RCV data) is routed to OUT port 108. In contrast, when the control signal is a logic low, data at IN port 106 (or data based on the IN data) is routed to OUT port 108, and data at RCV port 102 (or data based on the RCV data) is routed to SND port 104. In practical embodiments, RCV port 102 receives channel data, SND port 104 transmits channel data, IN port 106 is directly or indirectly connected to an OUT port of another channel device (not shown in FIG. 1), and OUT port 108 is directly or indirectly connected to an IN port of another channel device (not shown in FIG. 1). As described in more detail below, the channel data may represent actual data associated with a working channel or null data associated with a protection channel. Thus, when the control signal is a logic low, channel device 100 functions in a normal operating mode—the channel data is passed from RCV port 102 to SND port 104 (to serve as a transmit data signal), and the signal at IN port 106 is passed to OUT port 108 (to serve as an output data signal). When the control signal is logic high, however, channel device 100 functions in a protection mode—the channel data is routed from RCV port 102 to OUT port 108 and onward to another channel device.

Figure 2:
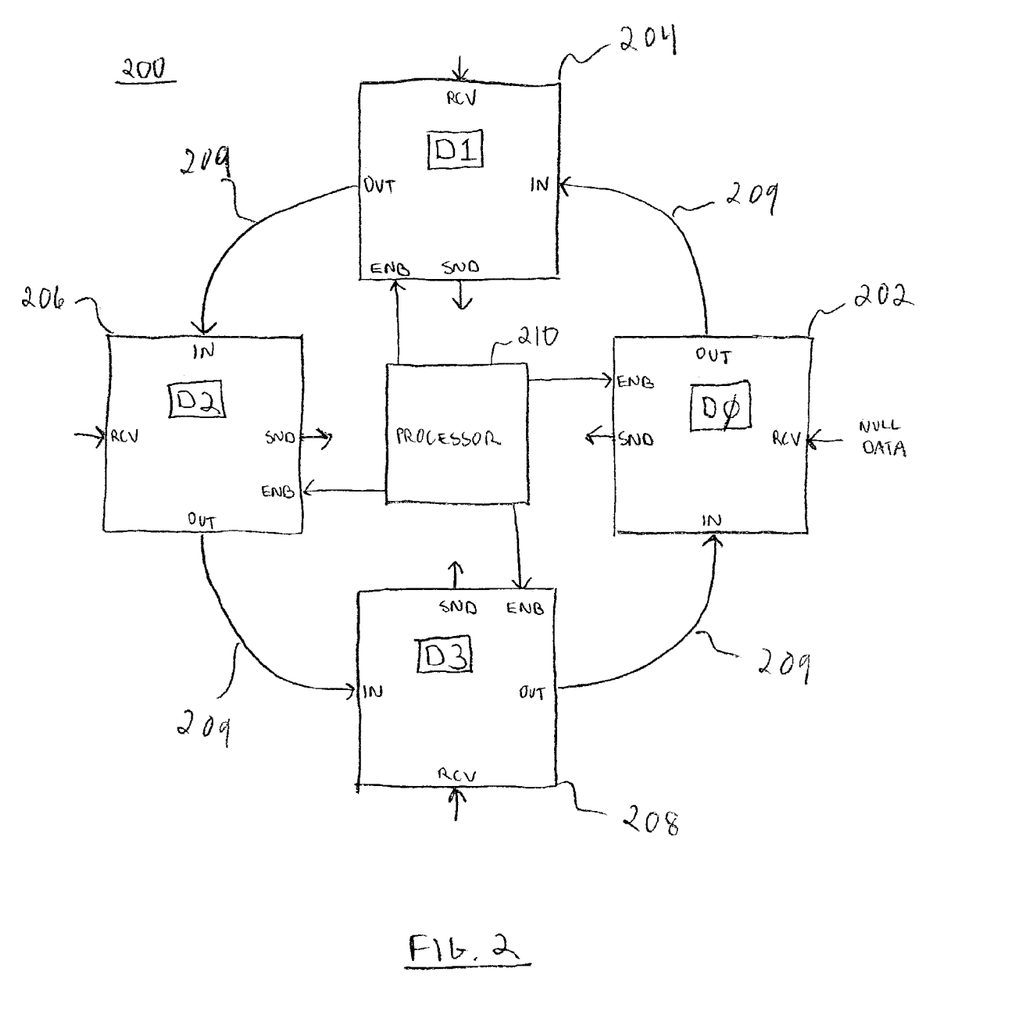
FIG. 2 is a schematic representation of a plurality of channel devices implemented in a node of a 1:N APS system.

FIG. 2 is a schematic representation of a plurality of channel devices implemented in a node 200 of a 1:N APS system, where N=3. For purposes of this example, node 200 is a transmit node. Each of the channel devices in node 200 is configured as described above in connection with channel device 100. Although node 200 is depicted with four channel devices 202/204/206/208, a practical embodiment may employ any number of channel devices. For purposes of this example, the channel devices are labeled D0, D1, D2, and D3 (such labeling is utilized to simplify the description and does not represent any sequence, relative priority, relative importance, physical layout, or the like).

The channel devices are preferably interconnected to form a loop architecture; node 200 includes a number of links 209, each establishing a data path between two channel devices. In this regard, the OUT port of channel device 202 is directly or indirectly connected to the IN port of channel device 204, the OUT port of channel device 204 is directly or indirectly connected to the IN port of channel device 206, and so on. Notably, node 200 is configured such that the number of links 209 equals the number of channel devices—only one link need be established between any two channel devices. These interconnections or links may be realized using any suitable electrical conductor, e.g., conductive traces, wires, cables, connectors, or the like.

In the example embodiment, the control signals for the channel devices are controlled and generated by one or more suitable processors 210. By generating the control signals, processor 210 determines how the various RCV signals are routed between and within the channel devices. In practice, processor 210 is configured to respond to channel performance metrics that determine whether node 200 functions in the normal operating mode or in the protection mode. In this regard, processor 210 may receive or process bit error rate information for each node such that processor 210 can perform centralized control over the channel devices. Processor 210 can determine whether one of the working channels has failed (or has performed out of specification), based on the channel performance metrics. In the example protection mode described herein, one of the channel devices functions as a protection channel device, one of the channel devices functions as a protected channel device (i.e., a protected channel device corresponds to a corrupted or failed transmission channel), and each of the remaining channel devices functions as a working channel device. As used herein, "channel performance metrics" mean any measurable, identifiable, or calculable characteristic, parameter, signal, data, quantity, or response associated with the transmission, receipt, or processing of data transported via the data communication channels to which the channel devices are connected. One commonly utilized channel performance metric is the bit error rate.

In a practical embodiment, the channel devices and processor 210 can be realized as field programmable gate arrays ("FPGAs"). Alternatively, processor 210 may be implemented as a network processor. In a practical deployment, processor 210 and each channel device is realized on a different circuit card, and the circuit cards are connected to a common motherboard.

In a 1:N APS, one of the channel devices supports a protection channel, while the remaining N channel devices support working channels. Under normal operating conditions, the N working channels carry "actual" working channel data from one node to another, while the protection channel carries null data. As used herein, "null data" refers to data that contains no useful or meaningful information, or low priority data that is not essential or important relative to the data transmitted over the N working channels. With reference to the example embodiment, under normal operating conditions, three channel devices will receive working channel data at the corresponding RCV ports and transmit the working data (or data based on the received working data), via the corresponding SND ports, to a destination node. When operating in the protection mode, one of the N channels is no longer used to convey working data, and the protection channel serves as a backup to the protected channel. The protection channel is typically pre-designated so that, after operation of the protected channel is restored, the protection channel switches back to serve as the carrier of the null data. The number of protection channels can be selected according to the anticipated reliability of the network.

In the example embodiment, channel device 202 serves as the designated protection device. In this regard, the RCV port of channel device 202 receives a null data signal and the SND port of channel device 202 connects to a protection channel (not shown in FIG. 2). When in the normal operating mode, each channel device passes channel data from its RCV port to its SND port for transmission over the corresponding working channel. In the normal operating mode, no meaningful or intelligent data is transmitted between the channel devices (i.e., the links between the OUT ports and the IN ports are not utilized).

Figure 3:
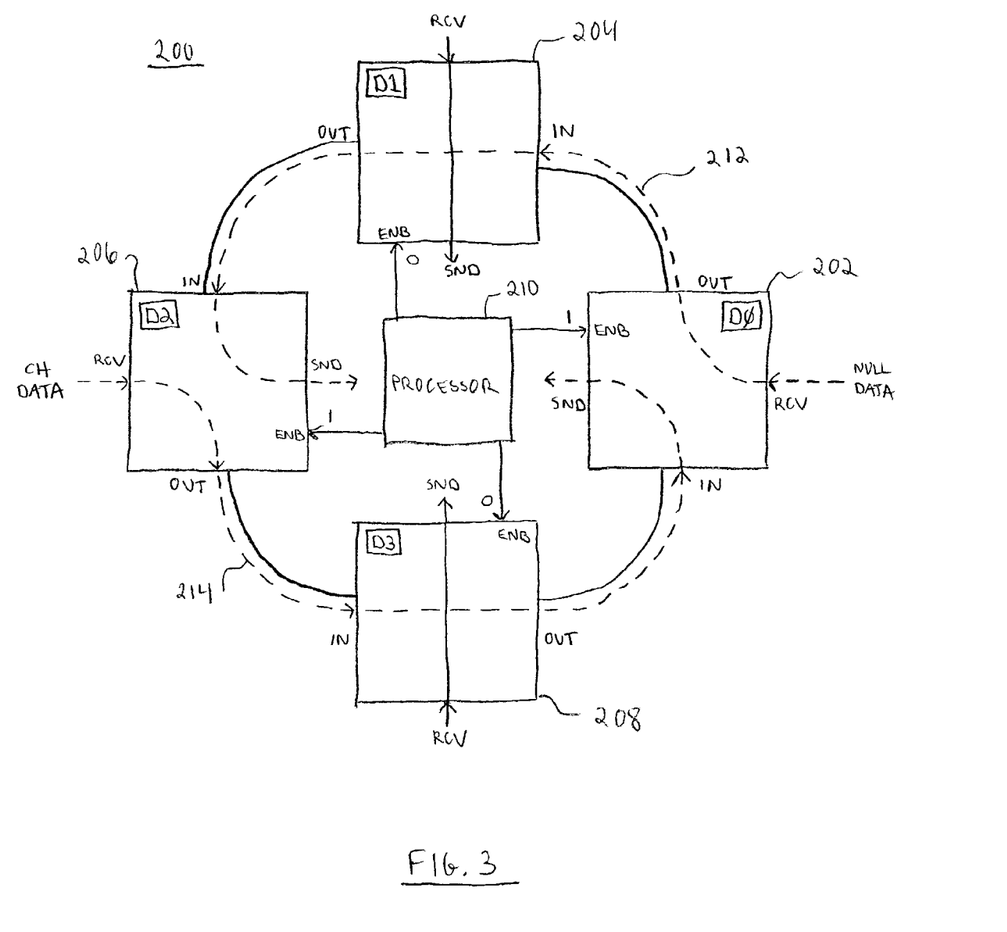
FIG. 3 is a schematic representation of the channel devices shown in FIG. 2 configured in a protection mode.

FIG. 3 is a schematic representation of the channel devices shown in FIG. 2 configured in a protection mode. FIG. 3 illustrates one example situation where channel device 202 is coupled to a protection channel, channel devices 204/208 are coupled to "good" working channels, and channel device 206 is coupled to a "bad" channel. In other words, the protection channel is being used as a backup to the working channel normally supported by channel device 206. As shown in FIG. 3, processor 210 generates logic low enable signals for channel device 204 and for channel device 208, and logic high enable signals for channel device 202 and channel device 206. In response to these enable signals, the SND signal for channel device 204 originates as the RCV signal received by channel device 204, the SND signal for channel device 208 originates as the RCV signal received by channel device 208, the SND signal for channel device 206 (the protected channel device) originates as the RCV signal received by channel device 202 (the protection channel device), and the SND signal for channel device 202 originates as the RCV signal received by channel device 206. In other words, the channel data signals for channel devices 202/206 are cross-coupled in the node state shown in FIG. 3.

FIG. 3 depicts a signal path 212 corresponding to the RCV signal received by channel device 202 and a signal path 214 corresponding to the RCV signal received by channel device 206. In the illustrated case where channel device 202 is connected to a protection channel, the RCV signal received by channel device 202 is a null data signal. Processor 210 manipulates the various control signals such that, in the protection mode, the signal routing arrangement of channel device 202 routes data from its RCV port to its output port (which may be linked to the input port of another channel device, e.g., channel device 204). Under the control of processor 210, the signal routing arrangement of channel device 204 routes data from its input port to its output port (which, in the example embodiment, is linked to the input port of channel device 206). In this manner, node 200 routes the null data signal from channel device 202, through channel device 204, and to channel device 206. The signal routing arrangement of channel device 206 is controlled to route the null data signal from the input port to the SND port. The null data signal may be sent over the "bad" channel connected to channel device 206 or analyzed to determine whether normal operation has been restored to the protected channel.

The channel devices are also controlled such that working channel data received at the RCV port of channel device 206 is routed from channel device 206, through channel device 208, and to channel device 202. In this regard, the signal routing arrangement of channel device 206 routes the channel data from its RCV port to its output port, channel device 208 routes the channel data from its input port to its output port, and channel device 202 routes the channel data from its input port to its SND port. Eventually, the working channel data is sent from channel device 202 over the protection channel. In the protection mode, the working channel data corresponding to any "good" channel (e.g., channel data handled by channel devices 204/208) is routed from the RCV port to the SND port of the respective channel device. In other words, "good" channels need not be reconfigured when node 200 operates in the protection mode.

Using the same techniques, processor 210 can arrange the control signals such that the RCV signal from any of the remaining three channel devices can be routed to the protection channel via the protection channel device. Generally, the APS technique described herein can be extended for use with a node having N working channel devices and one protection channel device by adding N channel devices to the ring architecture.

Figure 4:
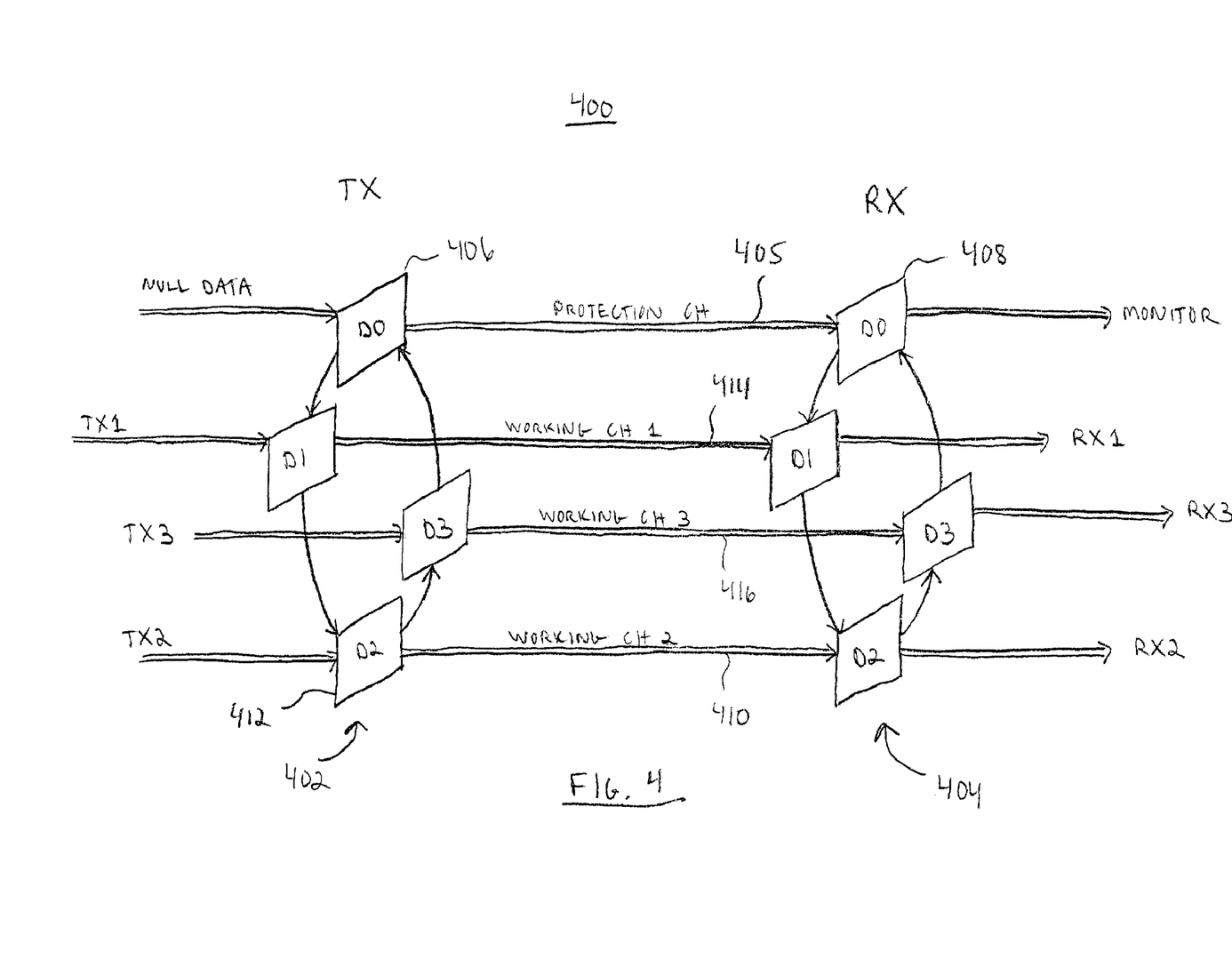
FIG. 4 is a schematic representation of a network that incorporates a 1:3 APS system.

FIG. 4 is a schematic representation of a portion of a network 400 that incorporates a 1:3 APS system. In this example, operation in only one direction (from a transmit node 402 to a receive node 404) is shown. The unidirectional scheme can be extended to a bi-directional scheme if the number of channel devices is doubled at each node.

Transmit node 402 and receive node 404 are configured as described above in connection with node 200. For the sake of clarity, the processors are not shown in FIG. 4. In network 400, a protection channel 405 is established between a channel device 406 (in transmit node 402) and a channel device 408 (in receive node 404). Using the example enable signal settings described above in connection with FIG. 3, if both transmit node 402 and receive node 404 have equivalent settings, then protection channel 405 is used to protect the second working channel 410. Consequently, the TX2 channel data signal received by channel device 412 (in transmit node 402) will be routed to channel device 406 and sent over protection channel 405, while the TX1 and TX3 channel data signals will be sent over the first working channel 414 and the third working channel 416, respectively. The data received by the receive channel devices may be suitably monitored to determine the quality of the respective channel, e.g., by way of bit error rate or other metrics.

In practical embodiments, signal quality may be adversely affected by routing the signals within a node. For example, in the ring topology described above, each route or link between the OUT port of one channel device and the IN port of the interconnected channel device includes a data bus and a clock used for timing of the data bus. As the data and clock travel through the channel devices in the ring, the quality of the data and/or the clock signal can be degraded. For example, the jitter of the clock signal typically increases with the number of channel devices and the setup and hold times of the data (with respect to the clock signal) may also degrade. Consequently, it may be desirable to provide a mechanism to mitigate these potential signal quality issues in a practical implementation of the present invention.

Figure 5:
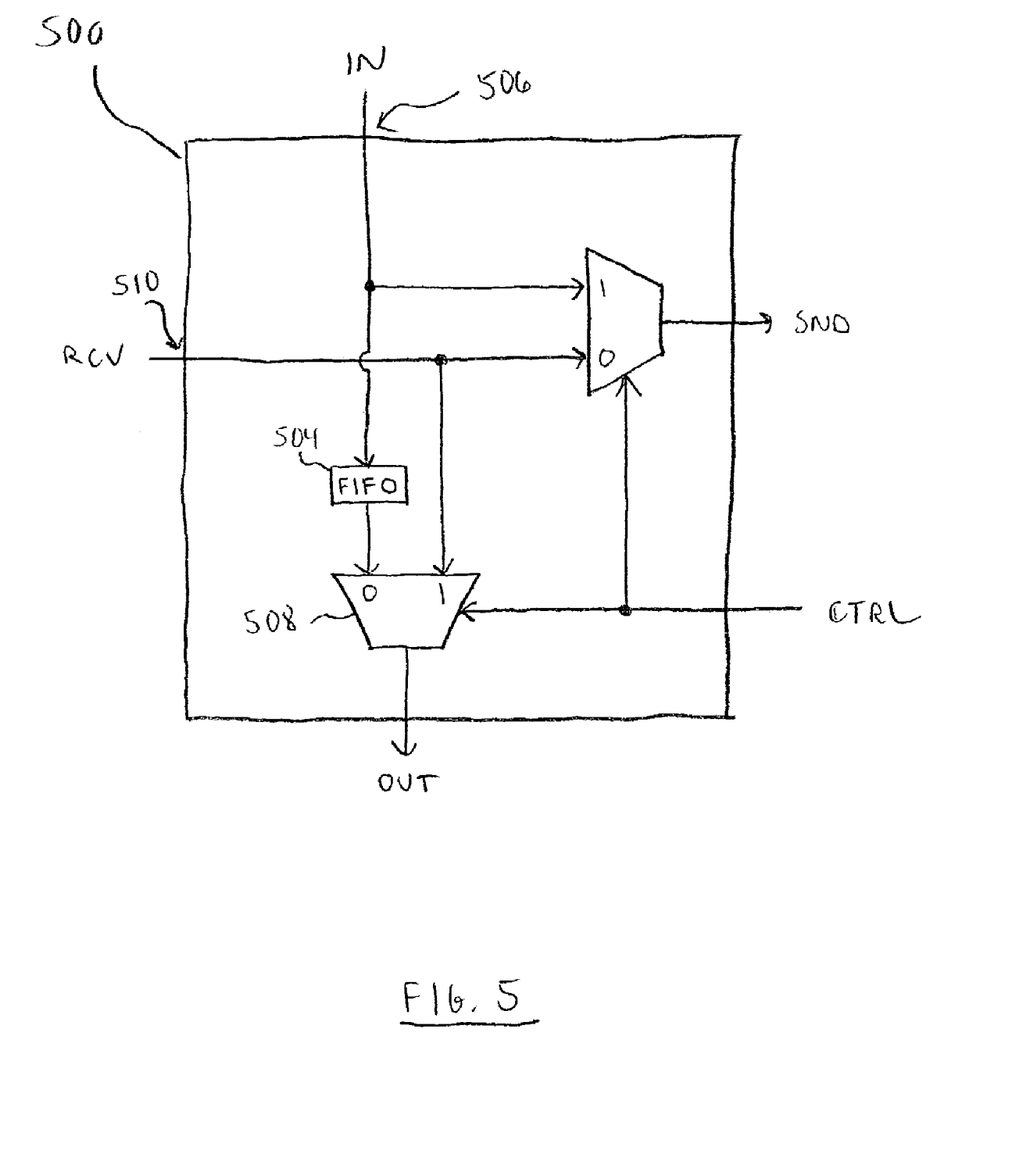
FIG. 5 is a schematic representation of an alternate channel device configured in accordance with the present invention.

FIG. 5 is a schematic representation of an alternate channel device 500 configured in accordance with the present invention. Channel device 500 is substantially identical to channel device 100 (see FIG. 1). Consequently, portions of the above description of channel device 100 apply equivalently to channel device 500. Briefly, in addition to the common features described above, channel device 500 includes a first-in-first-out (FIFO) element 504. A flip-flop (not shown) may be utilized to re-establish the timing relationship between the data and the clock received by channel device 500.

FIFO element 504 receives data from the IN port 506 of channel device 500, and provides data to a multiplexer 508, which selects data that serves as the OUT signal of channel device 500. FIFO element 504 is suitably configured and controlled to mitigate the degradation of the clock signal by retiming the incoming data with a clean clock signal. The clean clock signal is preferably generated locally in channel device 500. The clean clock signals utilized by the various channel devices may be based upon a single source (such as a crystal) or based upon multiple sources that are calibrated to have matching frequencies. In practice, the clean clock signal must have the same frequency (within practical tolerances) as the clock signal and data received at IN port 506. If this requirement is satisfied, then FIFO element 504 can effectively retime the incoming data. At the transmit node, assuming that all of the channel devices are clocked by the same clock source, this condition is met. At the receive node, each channel device synchronizes itself to the clock recovered from the respective data signal received at the RCV port 510. In a practical embodiment, all of the working channels receive data from the same transmit node. Consequently, the local clocks of all receive node channel devices must also be running at the same frequency.

Figure 6:
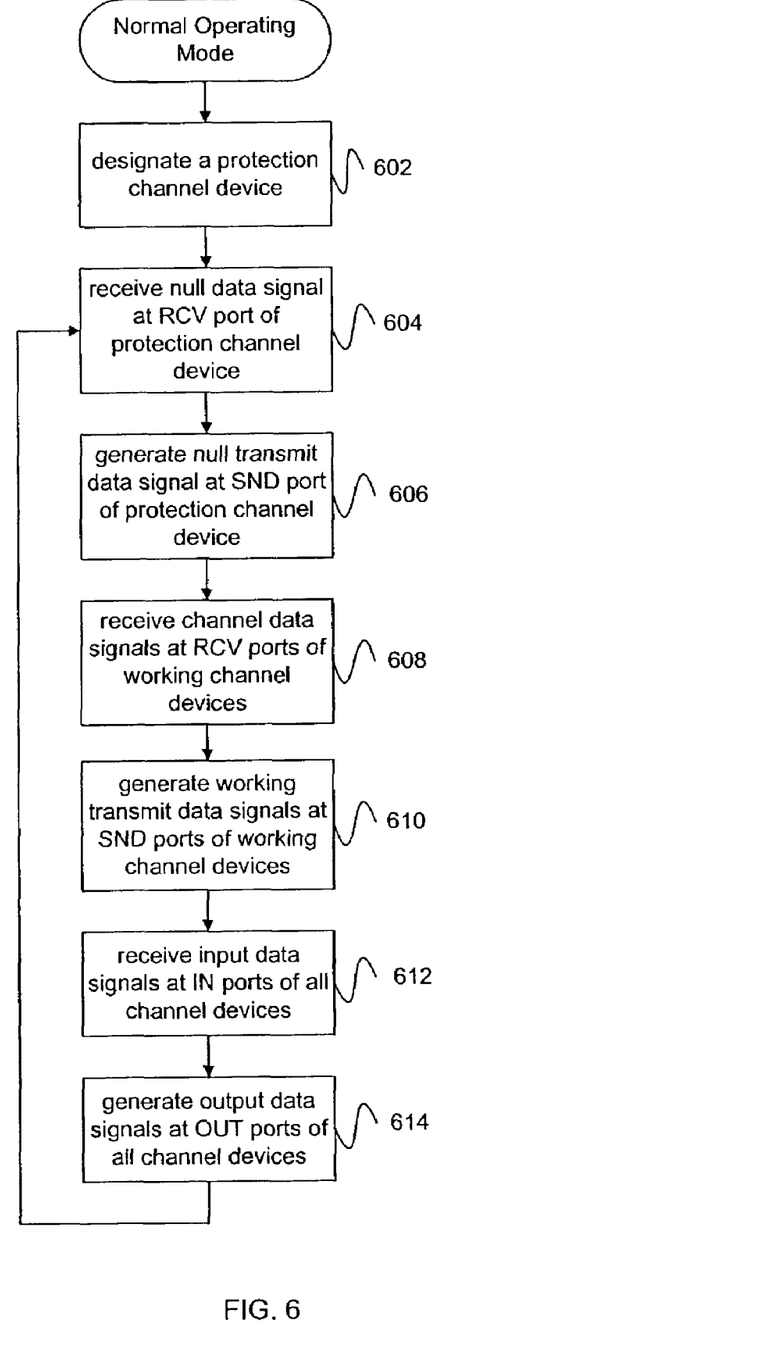
FIG. 6 is a flow chart illustrating a normal operating mode of a data communication node having a 1:N APS system.

FIG. 6 is a flow chart illustrating a normal operating mode of a data communication node having a 1:N APS system as described herein (see FIG. 2 and FIG. 3). As mentioned above, a 1:N APS system utilizes one protection channel to protect N working channels. In this regard, the node will include N+1 channel devices. Accordingly, a task 602 may be performed to designate one of the N+1 channel devices as a protection channel device that supports the protection channel. Task 602 may be performed dynamically during operation of the data communication system, or task 602 may be performed in connection with the deployment or initialization of the data communication system. The remaining N channel devices function as working channel devices to facilitate transmission of channel data between nodes.

The RCV port of the designated protection channel device may receive a null data signal (task 604), which is suitably routed by the protection channel device. The protection channel device generates a null transmit data signal at its SND port (task 606), where the null transmit data signal is based upon the received null data signal. In the preferred embodiment, the received null data signal is routed, via a multiplexer, from the RCV port to the SND port.

In addition, the working channel devices can receive working channel data at the respective RCV ports (task 608). The working channel devices generate working transmit data signals at their respective SND ports (task 610), and the working transmit data is sent over the working channels. The working transmit data signals are based on the received working channel data. In the preferred embodiment, the received working channel data is routed, by multiplexers in the working channel devices, from the respective RCV ports to the respective SND ports.

In the normal operating mode, data need not flow between the individual channel devices. Nonetheless, in the example embodiment, the channel devices are configured such that any data received at the IN ports of any given channel device (task 612) can be routed by the signal routing arrangement in the channel device. In this regard, the channel device may generate an output data signal at its OUT port (task 614), where the output data signal is based upon the received input data signal. As a practical matter, these input and output data signals need not contain intelligible information during the normal operating mode.

In a practical embodiment, the node may receive the null data signal and the various channel data signals concurrently or simultaneously. Likewise, the null transmit data signal and the working transmit data signals may be generated concurrently or simultaneously. FIG. 6 depicts the various process tasks in sequence only for ease of illustration and description. Unless otherwise expressly stated herein, the present invention need not perform the process tasks in any particular order.

Figure 7:
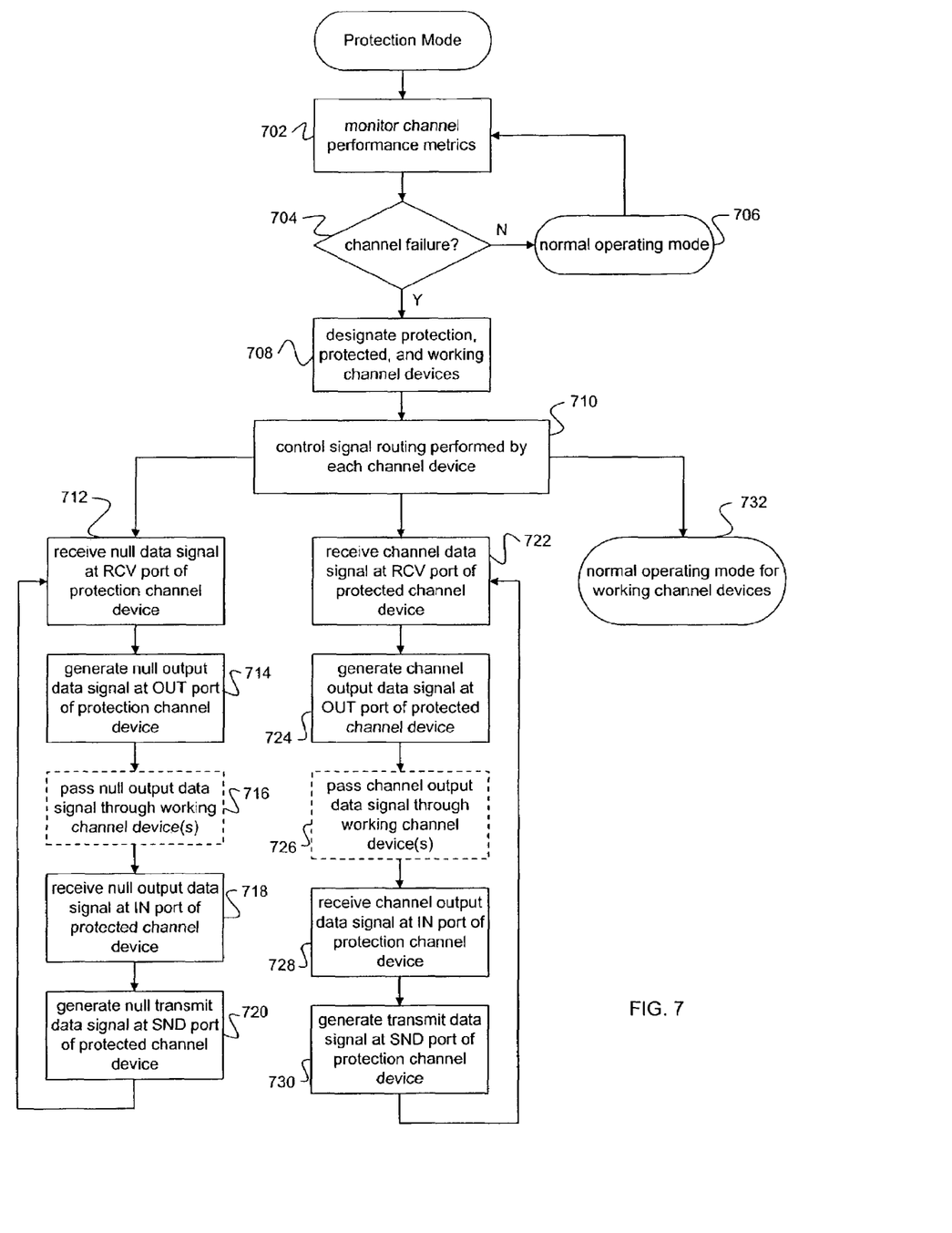
FIG. 7 is a flow chart illustrating a protection mode of a data communication node having a 1:N APS system.

In contrast to FIG. 6, FIG. 7 is a flow chart illustrating a protection mode of the data communication node. As a preliminary matter, the node (or a suitable element, component, system, or subsystem) may be configured to monitor channel performance metrics of the data communication network (task 702). As mentioned above, task 702 can monitor and/or analyze any number of system, channel, and/or signal characteristics to determine the quality of each working channel. If no channel failure is detected (query task 704), then the node continues in its normal operating mode (task 706), as described above in connection with FIG. 6. If a channel failure (or other triggering event or condition) has been detected, then the node may perform a task 708 to designate a protection channel device, a protected channel device (corresponding to the failed channel), and the working channel devices. In the preferred practical embodiment, task 708 designates one protected channel device and one protection channel device. The designation of the channel devices enables the node to control signal routing performed by each channel device (task 710). As described above, task 710 can be performed by a suitably configured processor that cooperates with each of the channel devices in the node.

The protection mode depicted in FIG. 7 governs each of the channel devices in the node: the protection channel device; the protected channel device; and the working channel devices. FIG. 7 depicts three branches from task 710; in a practical embodiment, each of these branches can be performed concurrently. Furthermore, as mentioned above, FIG. 7 depicts the various process tasks in sequence only for ease of illustration and description. Unless otherwise expressly stated herein, the present invention need not perform the process tasks in any particular order.

Regarding the operation of the protection channel device, a null data signal is received at the RCV port of the protection channel device (task 712), which generates a suitable null output data signal at its OUT port (714). The null output data signal can be identical to the received null data signal or otherwise based on the received null data signal. A task 716 may be performed to pass the null output data signal through one or more working channel devices connected between the protection channel device and the protected channel device. Task 716 will not be performed if no working channel devices reside between the protection and protected channel devices. The number of working channels between the protection and protected channel devices can vary depending upon the number of channel devices deployed by the node, the arrangement of channel devices in the node, and the location of the protected channel device relative to the protection channel device. For example, if one working channel device resides between the protection channel device and the protected channel device, then the null output data signal will be received at the IN port of the working channel device. Then, the working channel device will route the null output data signal from its IN port to its OUT port, thus making the null output data signal available to the protected channel device.

Eventually, the null output data signal is routed to, and received by, the IN port of the protected channel device (task 718). The protected channel device is suitably controlled to generate a null transmit data signal at its SND port (task 720). Alternatively, the null output data signal is discarded or disregarded by the node. In this manner, tasks 712, 714, 716, 718, and 720 cause the null data signal to be routed from the protection channel device to the protected channel device. The use of the null signal creates a "don't care" condition for the failed communication channel.

Regarding the protected channel device, a channel data signal is received at the RCV port of the protected channel device (task 722), which generates a channel output data signal at its OUT port (task 724). The channel output data signal is identical to, or otherwise based upon, the received channel data signal. A task 726 may be performed to pass the channel output data signal through one or more working channel devices connected between the protected channel device and the protection channel device. Task 726 will not be performed if no working channel devices reside between the protected and protection channel devices. The number of working channels between the protected and protection channel devices can vary depending upon the number of channel devices deployed by the node, the arrangement of channel devices in the node, and the location of the protected channel device relative to the protection channel device. For example, if one working channel device resides between the protected channel device and the protection channel device, then the channel output data signal will be received at the IN port of the working channel device. Then, the working channel device will route the channel output data signal from its IN port to its OUT port, thus making the channel output data signal available to the protection channel device.

Eventually, the channel output data signal is routed to, and received by, the IN port of the protection channel device (task 728). The protection channel device is suitably controlled to generate a transmit data signal at its SND port (task 730). The transmit data signal can be identical to, or otherwise based on, the channel output data signal received by the protection channel device. In this manner, tasks 722, 724, 726, 728, and 730 cause the channel data signal to be routed from the protected channel device to the protection channel device, from where it can be transmitted over the protection channel.

Regarding any remaining working channels, each of the corresponding working channel devices function in the normal operating mode to receive and send channel data over the respective communication channel (task 732). As described above, each working channel device will route the channel data from its RCV port to its SND port, and each working channel device will route the input data signal from its IN port to its OUT port.

The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention, as expressed in the claims. To distinguish similar elements from one another, the claims may refer to numbered elements, e.g., "first output signal" and "second output signal". Unless otherwise expressly stated herein, such numbering does not represent any particular ordering, sequence, level of importance, priority, or relative weighting of the recited elements.

What is claimed is:

1. A data communication node, comprising:
    a plurality of channel devices, each comprising:
        an input port;
        an output port;
        a data receive port configured to receive a channel data signal;
        a data send port configured to provide a transmit data signal to a data communication channel; and
        a signal routing arrangement configured to route data from said input port to said output port or to said data send port, and to route data from said data receive port to said output port or to said data send port;
    a plurality of links, each establishing a data path from said output port of one of said channel devices to said input port of another one of said channel devices; and
    a processor connected to said channel devices, said processor controlling said signal routing arrangement of each channel device to provide automatic protection switching for said data communication node;
    said processor being configured to respond to channel performance metrics; and
    said channel performance metrics indicating whether said data communication node functions in a normal operating mode or in a protection mode;
    wherein, in said protection mode:
    one of said channel devices functions as a protection channel device, one of said channel devices is a protected channel device, and each of the remaining channel devices functions as a working channel device;
    said data receive port of said protection channel device receives a null data signal;
    said data receive port of said protected channel device receives a channel data signal; and,
    said processor controls said signal routing arrangement of each of said channel devices to route said null data signal to said input port of said protected channel device, and to route said channel data signal to said data send port of said protection channel device.

2. A data communication node according to claim 1, wherein the number of said links equals the number of said channel devices.

3. A data communication node according to claim 1, wherein said processor is configured to generate control signals that control the operation of said signal routing arrangement of each channel device.

4. A data communication node according to claim 3, wherein each of said channel devices further comprises a control signal port configured to receive one of said control signals.

5. A data communication node according to claim 1, wherein, in said normal operating mode, said signal routing arrangement of each of said channel devices routes data from its data receive port to its data send port.

6. A data communication node according to claim 5, wherein, in said normal operating mode, said signal routing arrangement of each of said channel devices routes data from its input port to its output port.

7. A data communication node according to claim 1, wherein said data send port of said protection channel device is coupled to a protection data communication channel.

8. A data communication node according to claim 1, wherein said data communication node comprises a transmit node.

9. A data communication node according to claim 1, wherein said data communication node comprises a receive node.

10. An automatic protection switching method comprising:

in a normal operating mode:
  receiving a null data signal at a data receive port of a first channel device;
  generating, at a data send port of said first channel device, a first transmit data signal based on said null data signal;
  receiving a channel data signal at a data receive port of a second channel device; and
  generating, at a data send port of said second channel device, a second transmit data signal based on said channel data signal; and in a protection mode:
  generating, at an output port of said first channel device, a first output data signal based on said null data signal; and
  generating, at an output port of said second channel device, a second output data signal based on said channel data signal.

11. A method according to claim 10, further comprising, in said normal operating mode:
  receiving a first input data signal at an input port of said first channel device;
  generating, at said output port of said first channel device, a third output data signal based on said first input data signal;
  receiving a second input data signal at an input port of said second channel device; and
  generating, at said output port of said second channel device, a fourth output data signal based on said second input data signal.

12. A method according to claim 10, further comprising, in said protection mode:
  receiving, at an input port of said first channel device, a first input data signal based on said second output data signal; and
  generating, at said data send port of said first channel device, a third transmit data signal based on said first input data signal.

13. A method according to claim 10, further comprising, in said protection mode, passing said first output data signal through a working channel device connected between said first channel device and said second channel device.

14. A method according to claim 13, wherein passing said first output data signal comprises:
  receiving said first output data signal at an input port of said working channel device; and
  routing said first output data signal from said input port of said working channel device to an output port of said working channel device.

15. A method according to claim 10, further comprising, in said protection mode, passing said second output data signal through a working channel device connected between said first channel device and said second channel device.

16. A method according to claim 15, wherein passing said second output data signal comprises:
  receiving said second output data signal at an input port of said working channel device; and
  routing said second output data signal from said input port of said working channel device to an output port of said working channel device.

* * * * *